United States Patent
Fujiki

(10) Patent No.: US 12,330,695 B2
(45) Date of Patent: Jun. 17, 2025

(54) AIR CONDITIONING APPARATUS FOR RAILWAY VEHICLE

(71) Applicant: Mitsubishi Electric Corporation, Tokyo (JP)

(72) Inventor: Katsuhiro Fujiki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 18/247,766

(22) PCT Filed: May 25, 2021

(86) PCT No.: PCT/JP2021/019692
§ 371 (c)(1),
(2) Date: Apr. 4, 2023

(87) PCT Pub. No.: WO2022/130655
PCT Pub. Date: Jun. 23, 2022

(65) Prior Publication Data
US 2023/0331264 A1    Oct. 19, 2023

(30) Foreign Application Priority Data
Dec. 14, 2020   (JP) ................. 2020-206434

(51) Int. Cl.
*B61D 27/00*   (2006.01)
(52) U.S. Cl.
CPC ................. *B61D 27/0018* (2013.01)
(58) Field of Classification Search
CPC .. B61D 27/0018; F25B 2400/06; F25B 41/40; F28F 1/126; Y02T 30/00
See application file for complete search history.

(56) References Cited

U.S. PATENT DOCUMENTS

| 5,546,761 A | 8/1996 | Matsuo et al. |
| 2014/0196480 A1 | 7/2014 | Isoda et al. |

(Continued)

FOREIGN PATENT DOCUMENTS

| EP | 3376149 A1 | 9/2018 |
| JP | H04190096 A | 7/1992 |

(Continued)

OTHER PUBLICATIONS

Extended European Search Report dated May 10, 2024, issued in the corresponding European Patent Application No. 21906022.5, 9 pages.

(Continued)

*Primary Examiner* — Lionel Nouketcha
(74) *Attorney, Agent, or Firm* — BUCHANAN, INGERSOLL & ROONEY PC

(57) ABSTRACT

An air conditioning apparatus for a railway vehicle includes a compressor to compress a refrigerant, a condenser to condense the compressed refrigerant, an expander to expand the condensed refrigerant, an evaporator to vaporize the expanded refrigerant, and refrigerant piping connecting the compressor, the condenser, the expander, and the evaporator. One of the condenser or the evaporator is an indoor heat exchanger, and the other is an outdoor heat exchanger. At least one of the outdoor heat exchanger or the indoor heat exchanger includes a body including planar heat-transfer members and fins alternately stacked in a thickness direction of the planar heat-transfer members so as to have a stacked structure. Each planar heat-transfer member includes at an interior thereof refrigerant flow paths for flow therethrough of the refrigerant. The refrigerant flow paths are arranged in a direction in which air passes through the fins.

3 Claims, 7 Drawing Sheets

(56) References Cited

U.S. PATENT DOCUMENTS

| | | | |
|---|---|---|---|
| 2015/0075202 A1 | 3/2015 | Okuda et al. | |
| 2017/0355921 A1* | 12/2017 | Matsumoto | |
| 2020/0116365 A1* | 4/2020 | Komiya | F28F 1/20 |
| 2020/0182560 A1* | 6/2020 | Bhosale | F25B 39/04 |
| 2020/0232683 A1* | 7/2020 | Shingu | B61D 27/00 |

FOREIGN PATENT DOCUMENTS

| | | |
|---|---|---|
| JP | H08219588 A | 8/1996 |
| JP | 2007327653 A | 12/2007 |
| JP | 5617860 B2 | 11/2014 |
| JP | 6139093 B2 | 5/2017 |
| JP | 2020003155 A | 1/2020 |
| JP | 6656950 B2 | 3/2020 |
| WO | 2013046245 A1 | 4/2013 |
| WO | 2016147385 A1 | 9/2016 |
| WO | 2019116801 A1 | 6/2019 |

OTHER PUBLICATIONS

Notice of Reasons for Refusal dated Jan. 30, 2024, issued in the corresponding Japanese Patent Application No. 2022-569693, 10 Pages including 5 pages of English Translation.

International Search Report (PCT/ISA/210) with English translation and Written Opinion (PCT/ISA/237) mailed on Jul. 20, 2021, by the Japanese Patent Office as the International Searching Authority for International Application No. PCT/JP2021/019692.

* cited by examiner

AIR CONDITIONING APPARATUS FOR RAILWAY VEHICLE

TECHNICAL FIELD

The present disclosure relates to an air conditioning apparatus for a railway vehicle.

BACKGROUND ART

Patent Literature 1 describes a known air conditioning apparatus for a railway vehicle. This air conditioning apparatus includes a compressor that compresses a refrigerant, a condenser that condenses the refrigerant, an expander that expands the refrigerant, and an evaporator that vaporizes the refrigerant (hereafter, these are collectively referred to as four components). These four components provide a refrigeration cycle.

The condenser includes multiple heat-transfer pipes extending through fins. These heat-transfer pipes are serially interconnected and extend in a direction in which air passes through the fins.

The air conditioning apparatus described in Patent Literature 1 includes, in addition to the above four components, an accumulator that separates a liquid refrigerant from a gaseous refrigerant. In other words, the evaporator and the compressor are indirectly connected with the accumulator in between. The accumulator protects the compressor. This protection is described below.

In the refrigeration cycle, the liquid refrigerant may return to the compressor. When returning to the compressor, the liquid refrigerant dissolves in a lubricant in the compressor to dilute the lubricant. This can cause seizure in portions of the compressor in which components rub against each other.

A known air conditioning apparatus for a railway vehicle thus includes, in addition to the above four components, a compressor protection device that protects the compressor by reducing the liquid refrigerant returning to the compressor.

In the air conditioning apparatus described in Patent Literature 1, the above accumulator serves as the compressor protection device. In other known examples, the compressor protection device is, for example, a valve that prevents the liquid refrigerant from returning to the compressor or a heater that heats the compressor to vaporize the liquid refrigerant in the compressor.

CITATION LIST

Patent Literature

Patent Literature 1: Unexamined Japanese Patent Application Publication No. 2007-327653

SUMMARY OF INVENTION

Technical Problem

Compressor protection devices can restrict simplification and size reduction of an air conditioning apparatus for a railway vehicle. Additionally, compressor protection devices defining part of a refrigerant flow path, such as accumulators and valves, cause a pressure drop for the intended flow of the refrigerant. This pressure drop increases the power consumption of the compressor or degrades the air-conditioning performance of the air conditioning apparatus for a railway vehicle.

The air conditioning apparatus for a railway vehicle uses much more refrigerant per one refrigeration cycle than a household air conditioning apparatus that air-conditions a room in a house or an automobile air conditioning apparatus that air-conditions the passenger compartment of an automobile. Thus, the air conditioning apparatus for a railway vehicle may use the lubricant diluted with the refrigerant, and has difficulty in reducing the number of compressor protection devices.

An objective of the present disclosure is to provide an air conditioning apparatus for a railway vehicle including no compressor protection device or fewer compressor protection devices.

Solution to Problem

An air conditioning apparatus for a railway vehicle according to the present disclosure includes a compressor to compress a refrigerant, a condenser to condense the refrigerant compressed by the compressor, an expander to expand the refrigerant condensed by the condenser, an evaporator to vaporize the refrigerant expanded by the expander, and refrigerant piping connecting the compressor, the condenser, the expander, and the evaporator to provide a refrigeration cycle for circulation of the refrigerant. One of the condenser or the evaporator is an indoor heat exchanger to perform heat exchange between the refrigerant and air in a passenger compartment of a railway vehicle, and the other of the condenser or the evaporator is an outdoor heat exchanger to perform heat exchange between the refrigerant and air outside the railway vehicle. At least one of the outdoor heat exchanger or the indoor heat exchanger includes a body including planar heat-transfer members and fins alternately stacked in a thickness direction of the planar heat-transfer members so as to have a stacked structure. Each of the planar heat-transfer members includes, at an interior thereof, a plurality of refrigerant flow paths for flow therethrough of the refrigerant. The plurality of refrigerant flow paths in each of the planar heat-transfer members are arranged at the interior of the planar heat-transfer member in a direction in which air is to pass through the fins.

Advantageous Effects of Invention

The above structure achieves intended air-conditioning performance using less refrigerant per one refrigeration cycle than with known structures. The use of less refrigerant per one refrigeration cycle allows any liquid refrigerant dissolving in the lubricant inside the compressor to avoid causing an excessively low concentration of the lubricant in the mixture of the lubricant and the liquid refrigerant in the compressor. Thus, the compressor is less likely to have seizure inside. The air conditioning apparatus for a railway vehicle can thus include no compressor protection device or fewer compressor protection devices.

DESCRIPTION OF EMBODIMENTS

A comparative example is first described to clarify issues to be solved with the structures according to embodiments before the embodiments are described.

COMPARATIVE EXAMPLE

Figure 5:
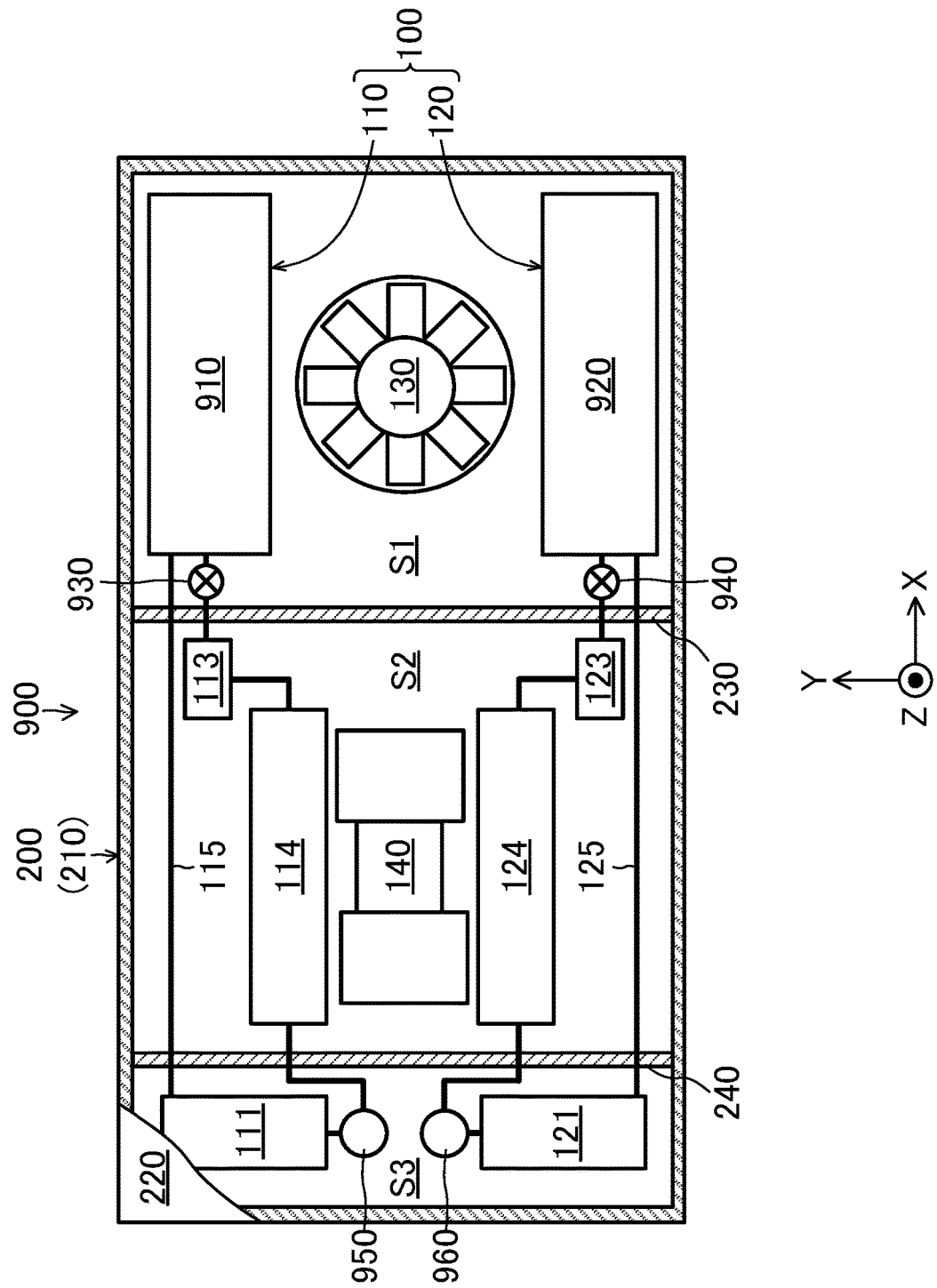
FIG. 5 is a schematic diagram of an air conditioning apparatus for a railway vehicle according to a comparative example.

As illustrated in FIG. 5, an air conditioning apparatus 900 for a railway vehicle in the comparative example includes an air conditioner 100 that air-conditions a passenger compartment of a railway vehicle and a casing 200 accommodating the air conditioner 100. The air conditioner 100 and the casing 200 are located on the roof of the railway vehicle.

The air conditioner 100 includes two refrigeration cycle devices 110 and 120 that each provide a refrigeration cycle using a refrigerant.

The refrigeration cycle device 110 includes a compressor 111 that compresses the refrigerant, an outdoor heat exchanger 910 serving as a condenser that condenses the refrigerant compressed by the compressor 111, an expander 113 that expands the refrigerant condensed by the outdoor heat exchanger 910, and an indoor heat exchanger 114 serving as an evaporator that vaporizes the refrigerant expanded by the expander 113.

The refrigeration cycle device 110 also includes refrigerant piping 115 having an interior for flow therethrough of the refrigerant. The refrigerant piping 115 connects the compressor 111, the outdoor heat exchanger 910, the expander 113, and the indoor heat exchanger 114 to provide a refrigeration cycle for circulation therethrough of the refrigerant.

Similarly, the refrigeration cycle device 120 includes a compressor 121 that compresses the refrigerant, an outdoor heat exchanger 920 serving as a condenser that condenses the refrigerant compressed by the compressor 121, an expander 123 that expands the refrigerant condensed by the outdoor heat exchanger 920, and an indoor heat exchanger 124 serving as an evaporator that vaporizes the refrigerant expanded by the expander 123.

The refrigeration cycle device 120 also includes refrigerant piping 125 having an interior for flow therethrough of the refrigerant. The refrigerant piping 125 connects the compressor 121, the outdoor heat exchanger 920, the expander 123, and the indoor heat exchanger 124 to provide a refrigeration cycle for circulation therethrough of the refrigerant.

Figure 6:
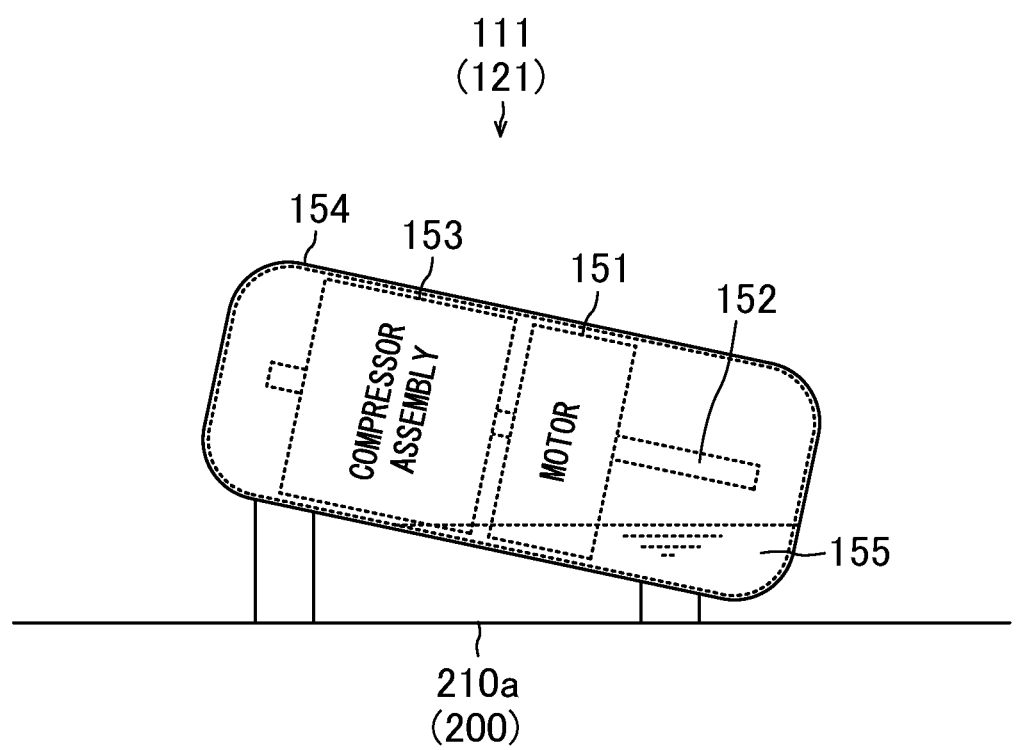
FIG. 6 is a schematic diagram of a compressor in Embodiment 1 and the comparative example.

As illustrated in FIG. 6, each of the compressors 111 and 121 includes a motor 151, a rotational shaft 152 rotated by the motor 151, a compressor assembly 153 that compresses the refrigerant with rotation of the rotational shaft 152, and a housing 154 that accommodates the motor 151, the rotational shaft 152, and the compressor assembly 153. Each of the compressors 111 and 121 is placed horizontally with the rotational shaft 152 inclined with respect to the vertical direction.

A lubricant 155 is stored in a portion of each of the compressors 111 and 121 at an interior thereof that can be exposed to the refrigerant in the housing 154. The lubricant 155 reduces friction at the bearing of the rotational shaft 152 and at the components in the compressor assembly 153 that rub against each other (hereafter collectively referred to as rubbing portions).

Referring back to FIG. 5, the air conditioning apparatus 900 for a railway vehicle includes an outdoor blower 130 that promotes heat exchange between the refrigerant in each of the outdoor heat exchangers 910 and 920 and air outside the vehicle (hereafter referred to as outside air). More specifically, the outdoor blower 130 causes an outside airflow that passes through the outdoor heat exchangers 910 and 920.

The air conditioning apparatus 900 for a railway vehicle includes an indoor blower 140 that promotes heat exchange between the refrigerant in each of the indoor heat exchangers 114 and 124 and air in the passenger compartment (hereafter referred to as inside air). More specifically, the indoor blower 140 causes an inside airflow that passes through the indoor heat exchangers 114 and 124.

The casing 200 includes a box-shaped base frame 210 having a bottom plate and a top plate 220 that closes an upper opening of the base frame 210. In FIG. 5, a part of the top plate 220 is illustrated to indicate the inside of the casing 200.

For ease of explanation, a right-handed XYZ orthogonal coordinate system is defined with X-axis parallel to the length direction of the railway vehicle, Y-axis parallel to the width direction of the railway vehicle, and Z-axis parallel to the height direction of the railway vehicle. A positive Z-direction corresponds to the upward direction in the height direction.

The casing 200 includes partition walls 230 and 240 that partition the interior space defined by the base frame 210 and the top plate 220 into an outdoor-unit chamber S1, an indoor-unit chamber S2, and a compressor chamber S3. The outdoor-unit chamber S1, the indoor-unit chamber S2, and the compressor chamber S3 are arranged in X-direction.

The outdoor-unit chamber S1 accommodates the outdoor heat exchangers 910 and 920 and the outdoor blower 130. The indoor-unit chamber S2 accommodates the expanders 113 and 123, the indoor heat exchangers 114 and 124, and the indoor blower 140. The compressor chamber S3 accommodates the compressors 111 and 121.

As described above, the casing 200 as a single member including the outdoor-unit chamber S1, the indoor-unit chamber S2, and the compressor chamber S3 accommodates the refrigeration cycle devices 110 and 120.

Figure 7:
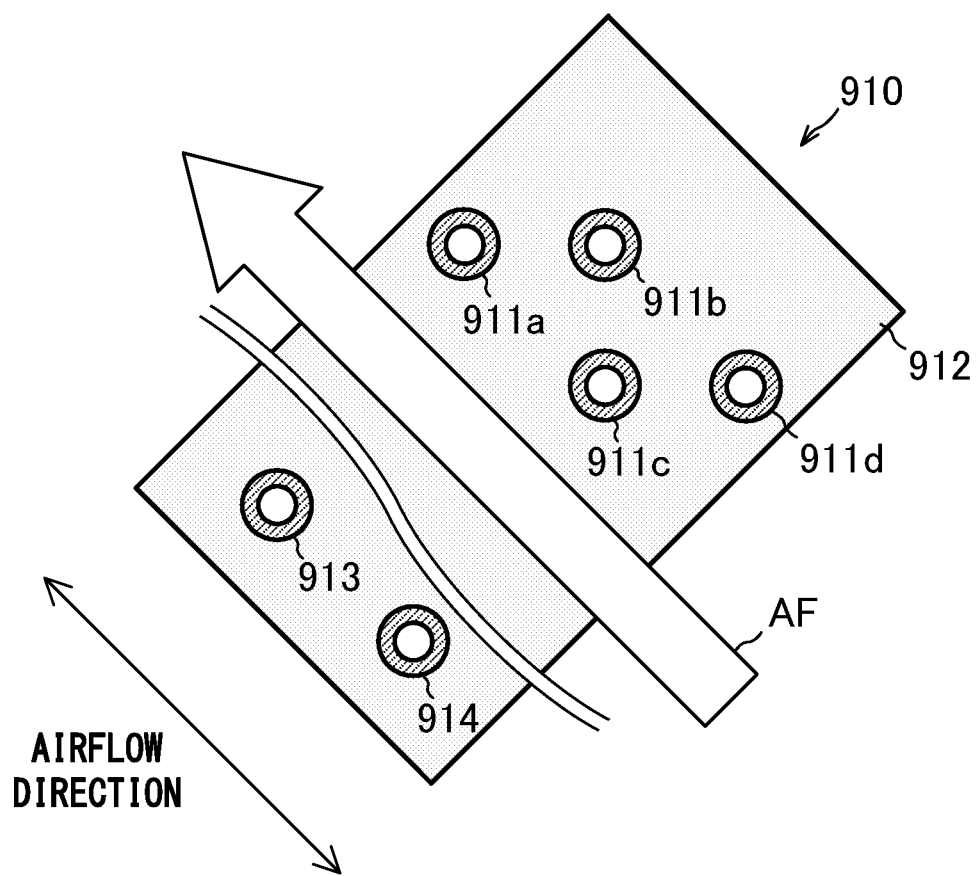
FIG. 7 is a schematic cross-sectional view of an outdoor heat exchanger in the comparative example.

FIG. 7 is a cross-sectional view of the outdoor heat exchanger 910 taken along a YZ plane. Although the outdoor heat exchanger 910 is described below, the outdoor heat exchanger 920 has a similar structure.

The outdoor heat exchanger 910 in the comparative example includes multiple heat-transfer pipes 911a, 911b, 911c, and 911d, and fins 912 that are physically in contact with the heat-transfer pipes 911a to 911d. The direction in which an outside airflow AF passes through the outdoor heat exchanger 910 is defined as an airflow direction. The heat-transfer pipes 911a to 911d are located at different positions in the airflow direction. Although not illustrated, multiple sets of heat-transfer pipes similar to the set of heat-transfer pipes 911a to 911d are arranged in a height direction perpendicular to the airflow direction.

The heat-transfer pipes 911a to 911d are serially connected at turns (not illustrated) located at both ends in X-direction. The outdoor heat exchanger 910 includes an inlet 913 through which the refrigerant to be used for heat exchange by the outdoor heat exchanger 910 flows in, and an outlet 914 through which the refrigerant used for heat exchange by the outdoor heat exchanger 910 flows out.

The refrigeration cycle devices 110 and 120 illustrated in FIG. 5 including the components described above alone may cause the liquid refrigerant to return to the compressors 111 and 121 during operation.

As described with reference to FIG. 6, each of the compressors 111 and 121 includes at the interior thereof the rubbing portions for which friction is to be reduced by the lubricant 155. The rubbing portions are exposed to the refrigerant provided to the compressors 111 and 121. The liquid refrigerant returning to the compressors 111 and 121 dissolves in the lubricant 155 inside the compressors 111 and 121 and dilutes the lubricant 155. As the refrigerant flows out of the compressors 111 and 121, the lubricant 155 flows out of the housing 154 of the compressors 111 and 121. This causes a shortage of the lubricant 155 inside the compressors 111 and 121, and may cause seizure in the rubbing portions.

As illustrated in FIG. 5, the air conditioning apparatus 900 in the comparative example thus includes, in addition to the four components of the refrigeration cycle, liquid-line electromagnetic valves 930 and 940 and accumulators 950 and 960.

More specifically, in the refrigeration cycle device 110, the outdoor heat exchanger 910 and the expander 113 are indirectly connected with the liquid-line electromagnetic valve 930 in between. The indoor heat exchanger 114 and the compressor 111 are indirectly connected with the accumulator 950 in between.

Similarly, in the refrigeration cycle device 120, the outdoor heat exchanger 920 and the expander 123 are indirectly connected with the liquid-line electromagnetic valve 940 in between. The indoor heat exchanger 124 and the compressor 121 are indirectly connected with the accumulator 960 in between.

When the compressor 111 stops, the liquid-line electromagnetic valve 930 prevents movement of the liquid refrigerant from the outdoor heat exchanger 910 toward the expander 113. The liquid-line electromagnetic valve 940 functions in the same manner.

The accumulator 950 allows the gaseous refrigerant vaporized at the indoor heat exchanger 114 to pass through but captures the liquid refrigerant remaining after vaporization at the indoor heat exchanger 114 to reduce the liquid refrigerant returning to the compressor 111. The accumulator 960 functions in the same manner.

The liquid-line electromagnetic valve 930 and the accumulator 950 described above are examples of compressor protection devices that reduce the liquid refrigerant returning to the compressor 111 to protect the compressor 111. The liquid-line electromagnetic valve 940 and the accumulator 960 are examples of compressor protection devices that reduce the liquid refrigerant returning to the compressor 121 to protect the compressor 121.

As described above, a known structure includes compressor protection devices to reduce seizure of the compressors 111 and 121. The air conditioning apparatus 900 including the two refrigeration cycle devices 110 and 120 is to include two sets of compressor protection devices, or more specifically, four compressor protection devices in total, including the liquid-line electromagnetic valve 930, the accumulator 950, the liquid-line electromagnetic valve 940, and the accumulator 960.

The compressor protection devices thus restrict simplification and size reduction of the air conditioning apparatus 900. The compressor protection devices, partly defining the refrigerant path, cause a pressure drop for the intended refrigerant flow. The pressure drop increases the power consumption of the compressors 111 and 121 or degrades the air-conditioning performance of the air conditioning apparatus 900.

The air conditioning apparatus 900 uses much more refrigerant per one refrigeration cycle than, for example, a household air conditioning apparatus that air-conditions a room in a house or an automobile air conditioning apparatus that air-conditions a passenger compartment of an automobile. More specifically, the refrigerant used by each one cycle of the refrigeration cycles provided by the refrigeration cycle devices 110 and 120 each is greater than or equal to 1 kg.

Thus, the air conditioning apparatus 900 is more likely to use the above lubricant diluted with the refrigerant than, for example, a household air conditioning apparatus and an automobile air conditioning apparatus, thus having difficulty in reducing the number of compressor protection devices.

As described above, the compressors 111 and 121 that are placed horizontally also cause difficulty in reducing the number of compressor protection devices. In other words, compared with when placed vertically with the rotational shaft 152 extending vertically, the compressors 111 and 121 placed horizontally as illustrated in FIG. 6 each have, for example, the motor 151 and the compressor assembly 153 to be exposed easily to the lubricant 155 inside the housing 154. This structure can easily allow the lubricant 155 to mix with the refrigerant inside the housing 154 and to be flown out of the housing 154 with the refrigerant discharged from the compressors 111 and 121. Thus, the compressors 111 and 121 placed horizontally are likely to have a shortage of lubricant 155. This shortage of the lubricant 155 is particularly severe for a liquid refrigerant returning to the compressors 111 and 121. Known structures thus have difficulty in or reducing the number of compressor protection devices that reduce the liquid refrigerant returning to the compressors 111 and 121.

Embodiment 1

In the present embodiment, the above difficulty is solved with improved outdoor heat exchangers 910 and 920. An air conditioning apparatus for a railway vehicle according to the present embodiment is described below with reference to FIGS. 1 to 4. In FIGS. 1 to 4, the same reference signs denote the same or corresponding components illustrated in FIG. 5.

Figure 1:
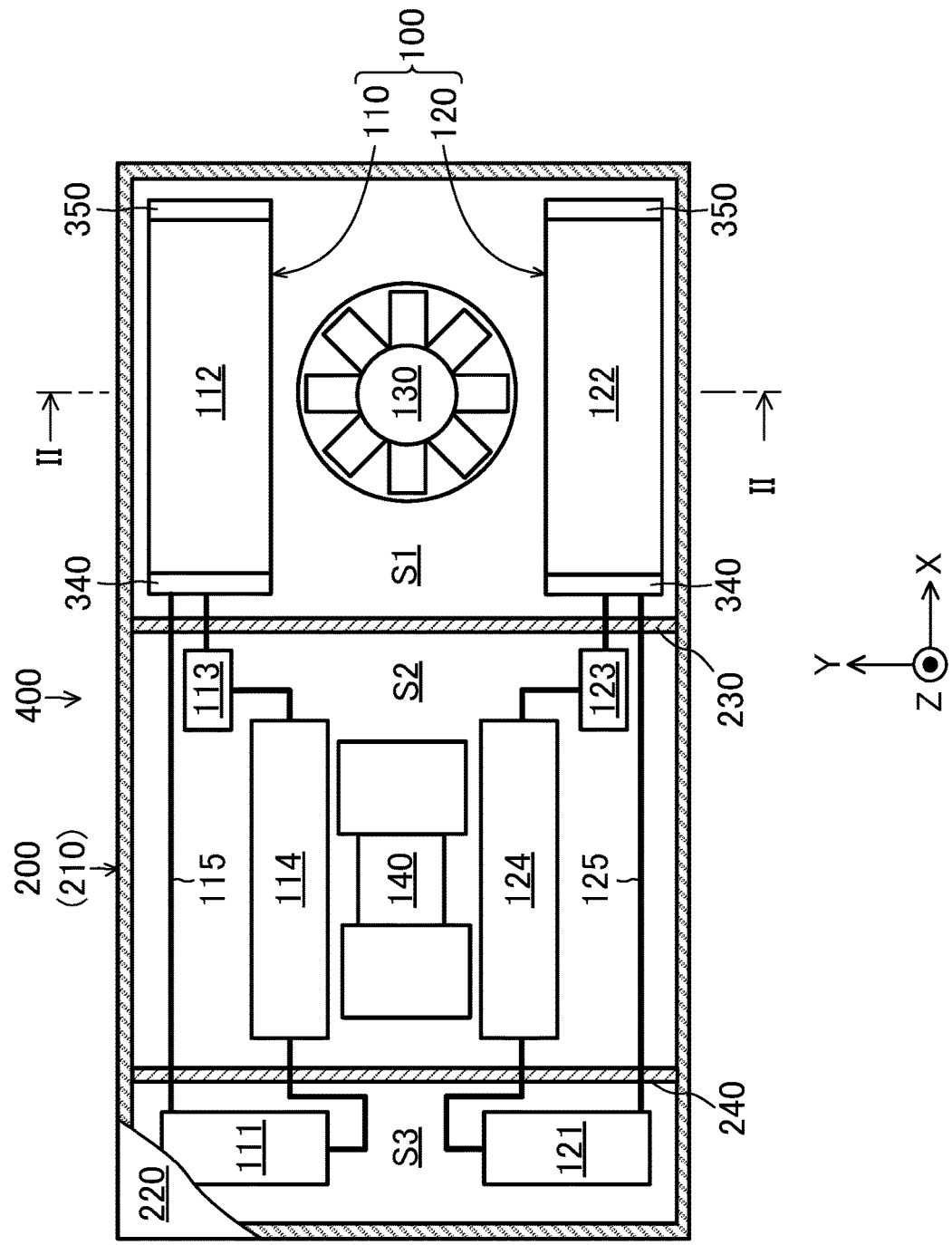
FIG. 1 is a schematic diagram of an air conditioning apparatus for a railway vehicle according to Embodiment 1.

FIG. 1 illustrates an air conditioning apparatus 400 for a railway vehicle according to the present embodiment. In the present embodiment, a refrigeration cycle device 110 includes an outdoor heat exchanger 112 that allows the refrigeration cycle provided by the refrigeration cycle device 110 to use less refrigerant per one refrigeration cycle than known refrigeration cycles while maintaining the air-conditioning performance of the refrigeration cycle device 110 at substantially the same level as known systems. Hereafter, the amount of refrigerant used per one refrigeration cycle is simply referred to as the refrigerant amount.

Similarly, the refrigeration cycle device 120 includes an outdoor heat exchanger 122 that enables a refrigerant amount in the refrigeration cycle device 120 less than known systems while maintaining the air-conditioning performance of the refrigeration cycle device 120 at substantially the same level as known systems. The specific structures of the outdoor heat exchangers 112 and 122 are described below with reference to FIGS. 2 to 4.

The air-conditioning performance refers to the heat energy removed from a passenger compartment per unit time. In the present embodiment, the refrigeration cycle devices 110 and 120 are used to cool a passenger compartment. In some embodiments, the refrigeration cycle devices 110 and 120 may be used to heat a passenger compartment. In this case, the air-conditioning performance refers to the heat energy provided to a passenger compartment per unit time.

More specifically, the outdoor heat exchanger 112 in the refrigeration cycle device 110 maintained the air-conditioning performance of the refrigeration cycle device 110 at substantially the same level as known systems by using half or less than half the amount of refrigerant used in the known systems within a range of greater than or equal to 1 kg. The air-conditioning efficiency index Q/M kW/kg increased to greater than or equal to 8 kW/kg. The air-conditioning efficiency index Q/M kW/kg defined as an air-conditioning performance Q kW of the refrigeration cycle device 110 divided by a refrigerant amount M kg (where M is greater than or equal to 1) used in the refrigeration cycle device 110.

Similarly, the outdoor heat exchanger 122 in the refrigeration cycle device 120 maintained the air-conditioning performance of the refrigeration cycle device 120 at substantially the same level as known systems by using half or less than half of the refrigerant amount used in the known systems within a range of greater than or equal to 1 kg. The air-conditioning efficiency index Q/M kW/kg (where M is greater than or equal to 1) of the refrigeration cycle device 120 increased to greater than or equal to 8 kW/kg.

As described above, the refrigerant amount in the refrigeration cycle device 110 was less than those in known systems. Thus, the compressor 111 placed horizontally as illustrated in FIG. 6 is less likely to have seizure resulting from the lubricant 155 diluted with the refrigerant.

The refrigeration cycle device 110 can thus eliminate the liquid-line electromagnetic valve 930 and the accumulator 950 serving as compressor protection devices illustrated in FIG. 5. More specifically, in the refrigeration cycle device 110, the outdoor heat exchanger 112 and the expander 113 are directly connected with the refrigerant piping 115, and the indoor heat exchanger 114 and the compressor 111 are directly connected with the refrigerant piping 115.

Similarly, the refrigerant amount in the refrigeration cycle device 120 was less than those in known systems. Thus, the compressor 121 placed horizontally as illustrated in FIG. 6 is less likely to have seizure resulting from the lubricant 155 diluted with the refrigerant.

The refrigeration cycle device 120 can thus eliminate the liquid-line electromagnetic valve 940 and the accumulator 960 serving as compressor protection devices illustrated in FIG. 5. More specifically, in the refrigeration cycle device 120, the outdoor heat exchanger 122 and the expander 123 are directly connected with the refrigerant piping 125, and the indoor heat exchanger 124 and the compressor 121 are directly connected with the refrigerant piping 125.

As described above, the refrigeration cycle device 110 including the outdoor heat exchanger 112 and the expander 113 directly connected with the refrigerant piping 115 causes a smaller pressure drop of the refrigerant than in known systems between the outdoor heat exchanger 112 and the expander 113.

More specifically, a Cv value of the overall portion of the refrigerant piping 115 connecting the outdoor heat exchanger 112 and the expander 113 increases to greater than or equal to 2. Similarly, the Cv value of the overall portion of the refrigerant piping 125 in the refrigeration cycle device 120 connecting the outdoor heat exchanger 122 and the expander 123 increases to greater than or equal to 2.

The Cv value herein refers to a dimensionless numerical value in US gal/min (where 1 US gal=3.785 L), of the flow rate of water at a temperature of 60° F. (≈15.5° C.) with a pressure difference of 1 lbf/in2 (≈6.895 kPa). A smaller pressure drop leads to a greater Cv value.

The refrigeration cycle device 110 including the indoor heat exchanger 114 and the compressor 111 directly connected with the refrigerant piping 115 causes a smaller pressure drop of the refrigerant than known systems between the indoor heat exchanger 114 and the compressor 111.

More specifically, the Cv value of the overall portion of the refrigerant piping 115 connecting the indoor heat exchanger 114 and the compressor 111 increases to greater than or equal to 12. Similarly, in the refrigeration cycle device 120, the Cv value of the overall portion of the refrigerant piping 125 connecting the indoor heat exchanger 124 and the compressor 121 increases to greater than or equal to 12.

The structure of the outdoor heat exchangers 112 and 122 that produces the above effects is now described.

Figure 2:
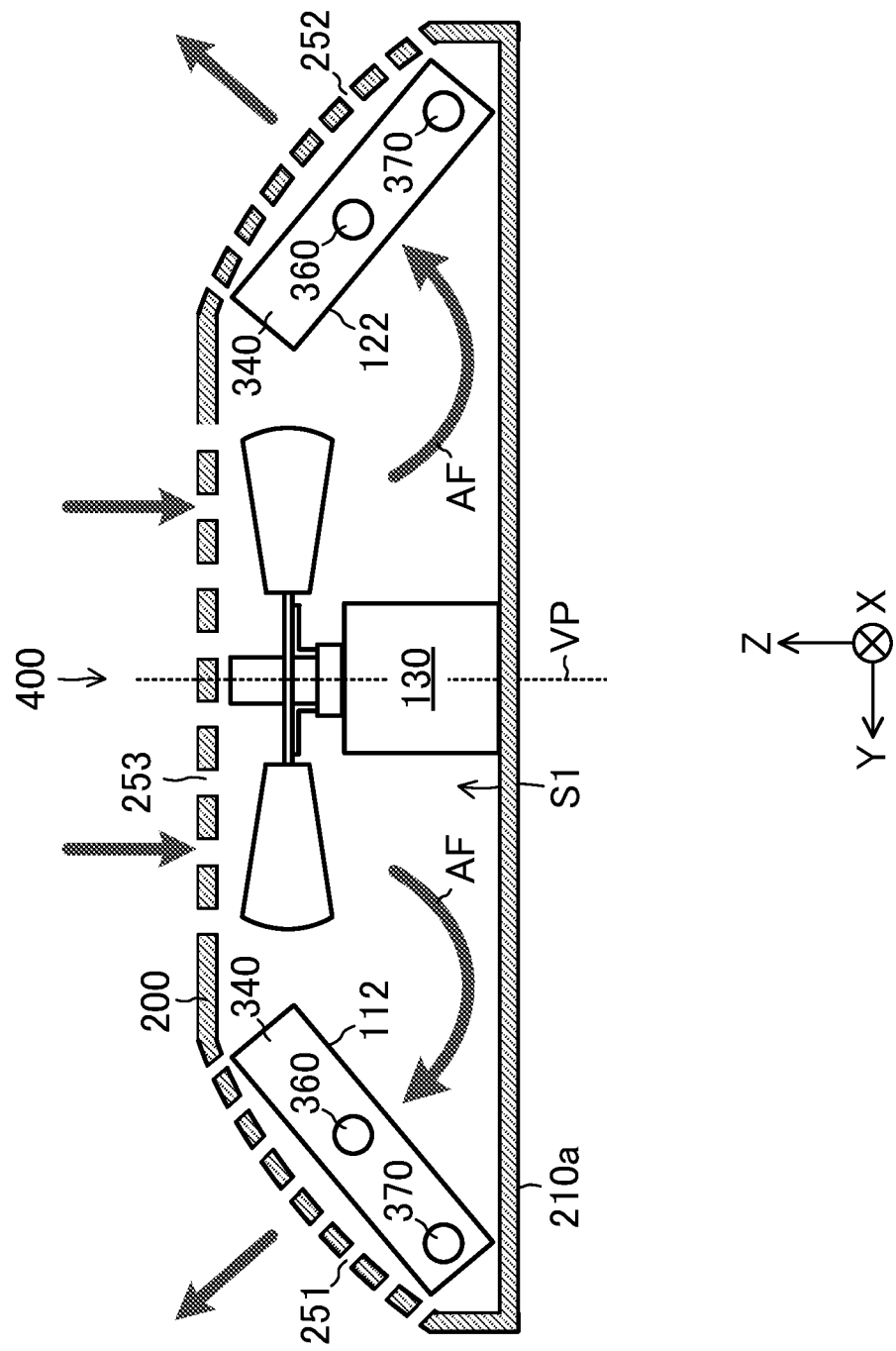
FIG. 2 is a cross-sectional view of an outdoor-unit chamber in Embodiment 1, as viewed in parallel to the width direction of a railway vehicle.

FIG. 2 is a cross-sectional view taken along line II-II in FIG. 1. As illustrated in FIG. 2, the outdoor heat exchangers 112 and 122 face each other in Y-direction. The outdoor blower 130 is located between the outdoor heat exchangers 112 and 122.

More specifically, the outdoor heat exchangers 112 and 122 are symmetric with each other with respect to an imaginary XZ plane VP extending through the outdoor blower 130. The imaginary XZ plane VP is an imaginary plane parallel to X-axis and Z-axis. The outdoor heat exchangers 112 and 122 have the upper ends inclined toward the outdoor blower 130 with respect to a bottom plate 210a of the casing 200.

The casing 200 has first vents 251 connected outside in a portion facing the outdoor heat exchanger 112. Similarly, the casing 200 has second vents 252 connected outside in a portion facing the outdoor heat exchanger 122. The casing 200 has third vents 253 connected outside in a portion facing the outdoor blower 130.

The outdoor blower 130 draws outside air into the outdoor-unit chamber S1 through the first vents 251 and the second vents 252 or through the third vents 253, allows the outside air drawn into the outdoor-unit chamber S1 to pass through the outdoor heat exchangers 112 and 122, and discharges the air outside through the first vents 251 and the second vents 252 or through the third vents 253.

More specifically, the outdoor blower 130 draws the outside air into the outdoor-unit chamber S1 through the third vents 253 to generate an airflow AF in the outdoor-unit chamber S1. The airflow AF passes through the outdoor heat exchangers 112 and 122 in the thickness direction and then flows out through the first vents 251 and the second vents 252.

The outdoor heat exchanger 112 is described below as a typical example. The outdoor heat exchanger 122 has the same structure as the outdoor heat exchanger 112.

Figure 3:
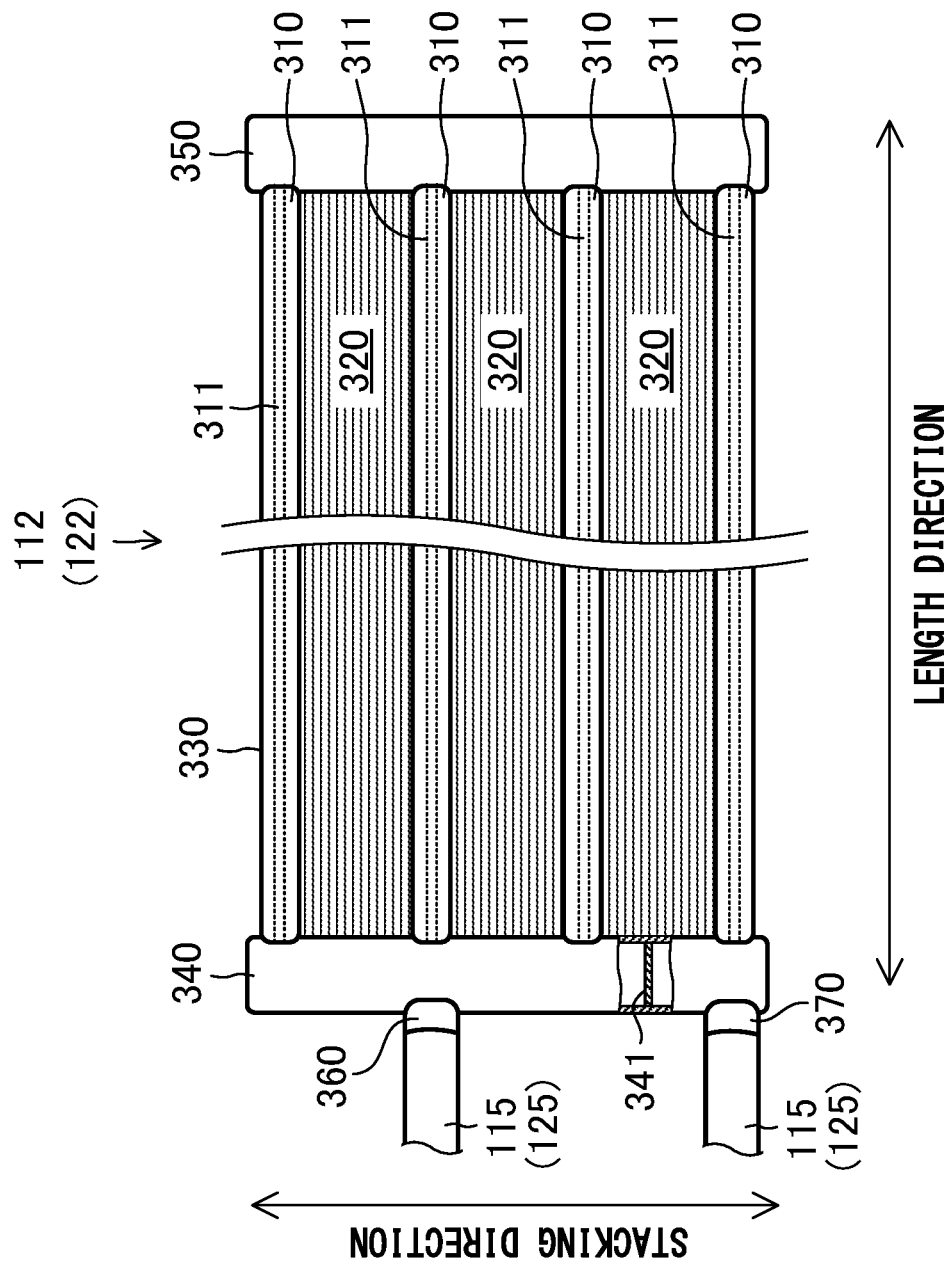
FIG. 3 is a side view of an outdoor heat exchanger in Embodiment 1 as viewed in an airflow direction.

FIG. 3 is a side view of the outdoor heat exchanger 112 as viewed in the direction in which the airflow AF moves. As illustrated in FIG. 3, the outdoor heat exchanger 112 includes a body 330. The body 330 includes planar heat-transfer members 310 and fins 320 alternately stacked so as to have a stacked structure. The refrigerant flows through the interior of the planar heat-transfer members 310.

In the body 330, the planar heat-transfer members 310 and the fins 320 are stacked in the thickness direction (hereafter referred to as a stacking direction) of the planar heat-transfer members 310.

The stacking direction is perpendicular to the direction in which the airflow AF illustrated in FIG. 2 passes through the outdoor heat exchanger 112 (hereafter referred to as an airflow direction) and to the length direction of each planar heat-transfer member 310 (hereafter simply referred to as a length direction). The width direction perpendicular to the thickness direction of the planar heat-transfer members 310 matches the airflow direction.

Figure 4:
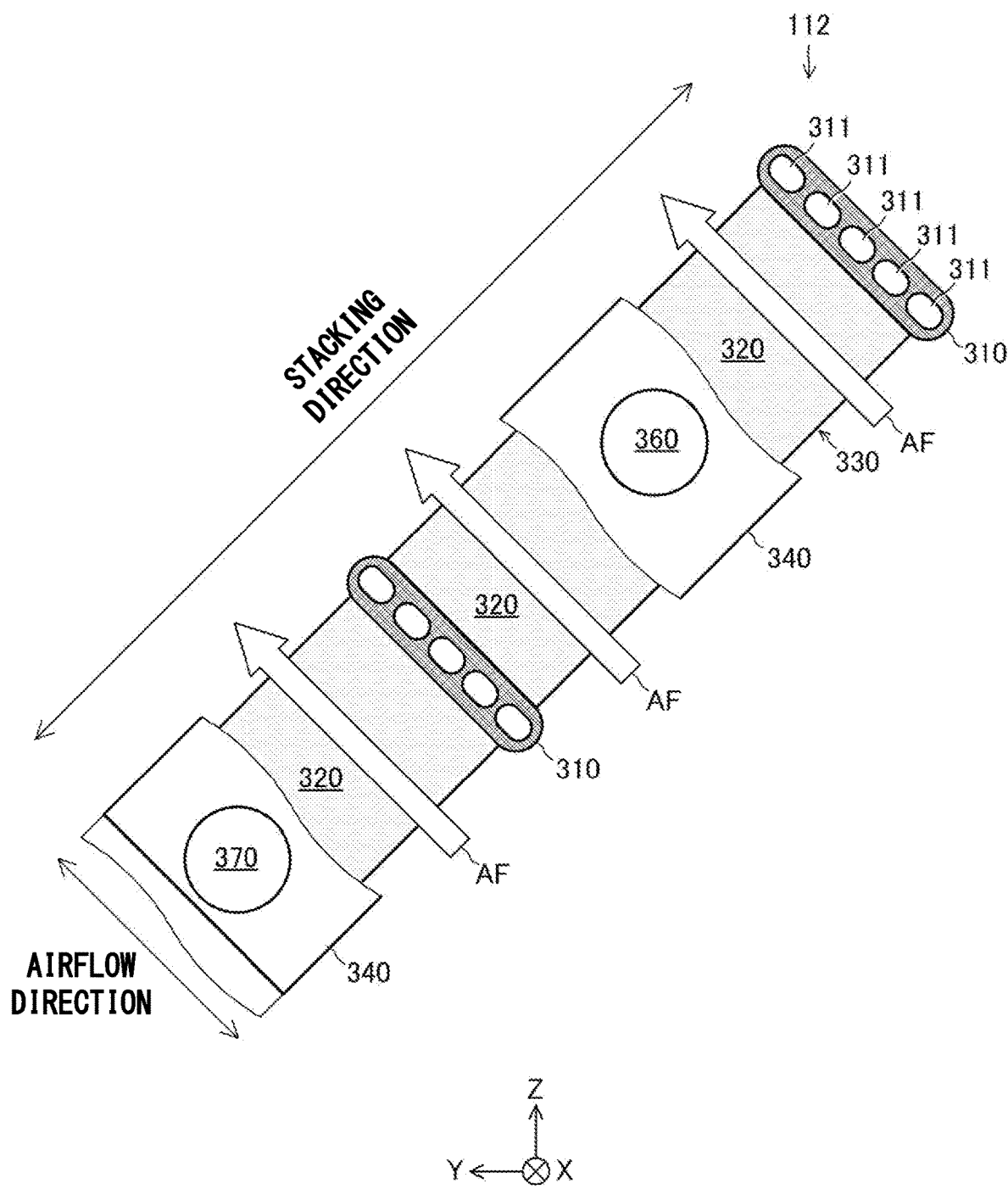
FIG. 4 is a partial cross-sectional view of the outdoor heat exchanger according to Embodiment 1, as viewed in a direction perpendicular to the length direction of the railway vehicle.

FIG. 4 is a partial cross-sectional view of the outdoor heat exchanger 112 as viewed in a direction parallel to an YZ plane. As illustrated in FIG. 4, each planar heat-transfer member 310 includes, at the interior thereof, multiple refrigerant flow paths 311. The refrigerant flows through the refrigerant flow paths 311. The refrigerant flow paths 311 in each planar heat-transfer member 310 are arranged in the airflow direction. Each planar heat-transfer member 310 thus has, as viewed in a direction parallel to the YZ plane, a cross section that is flat and elongated in one direction, or more specifically, in the airflow direction.

The planar heat-transfer members 310 with this structure can be manufactured by extrusion of a metal, or more specifically, aluminum.

Each fin 320 is brazed to the planar heat-transfer members 310 adjacent in the stacking direction. Thus, each fin 320 is thermally coupled to the planar heat-transfer members 310 adjacent in the stacking direction. More specifically, each fin 320 is a corrugated fin formed from a metal plate folded in a wave shape.

Referring back to FIG. 3, the outdoor heat exchanger 112 also includes a first header pipe 340 located at one end of the body 330 in the length direction and a second header pipe 350 located at the other end of the body 330 in the length direction. The first header pipe 340 and the second header pipe 350 extend in the stacking direction.

The first header pipe 340 connects the refrigerant flow paths 311 in each planar heat-transfer member 310 to one another. Similarly, the second header pipe 350 connects the refrigerant flow paths 311 in each planar heat-transfer member 310 to one another. Thus, the refrigerant flow paths 311 in each planar heat-transfer member 310 arranged in the airflow direction are connected in parallel to one another.

The first header pipe 340 includes an inlet 360 through which the refrigerant to be used by the outdoor heat exchanger 112 for heat exchange flows in, and an outlet 370 through which the refrigerant used by the outdoor heat exchanger 112 for heat exchange flows out.

The inlet 360 and the outlet 370 face each other in the stacking direction. The refrigerant piping 115 illustrated in FIG. 1 is connected to the inlet 360 and the outlet 370. More specifically, the first header pipe 340 allows the refrigerant to flow into and out of the outdoor heat exchanger 112.

The first header pipe 340 includes a partition 341 that blocks the refrigerant between the inlet 360 and the outlet 370 in the stacking direction. The direction from the partition 341 toward the inlet 360 in the stacking direction is defined as a positive stacking direction, and the direction from the partition 341 toward the outlet 370 in the stacking direction is defined as a negative stacking direction.

The refrigerant flows from the first header pipe 340 toward the second header pipe 350 through the refrigerant flow paths 311 in the planar heat-transfer members 310 located in the positive stacking direction from the partition 341. The refrigerant flows from the second header pipe 350 toward the first header pipe 340 along the refrigerant flow paths 311 in the planar heat-transfer members 310 located in the negative stacking direction from the partition 341.

Although the structure of the outdoor heat exchanger 112 is described above, the outdoor heat exchanger 122 has the same structure as the outdoor heat exchanger 112. As described above, the outdoor heat exchangers 112 and 122 in the present embodiment each include the flat planar heat-transfer members 310 and the fins 320 alternately stacked. The flat planar heat-transfer members 310 each include, at the interior thereof, the refrigerant flow paths 311. This structure enhances the heat exchange efficiency of the outdoor heat exchangers 112 and 122.

The structure thus enables the refrigerant amount in the refrigeration cycle devices 110 and 120 illustrated in FIG. 1 less than those in known systems while maintaining the air-conditioning performance of the refrigeration cycle devices 110 and 120 at substantially the same level as the known systems.

In the refrigeration cycle devices 110 and 120 with the refrigerant amount less than those in known systems, any liquid refrigerant dissolving in the lubricant 155 inside the compressors 111 and 121 does not cause a large amount of the lubricant 155 to flow out of the compressors 111 and 121, thus causing less seizure inside the compressors 111 and 121. This structure can eliminate the compressor protection devices used in known systems as described above.

Embodiment 2

In Embodiment 1, the refrigerant used in the refrigeration cycle devices 110 and 120 is not limited to a particular refrigerant. For example, a refrigerant with a higher coefficient of performance than the refrigerant with the refrigerant number R407C, or specifically, a refrigerant containing at least 50% by mass of difluoromethane ($CH_2F_2$), may be used as the refrigerant.

More specifically, in Embodiment 2, a refrigerant with the refrigerant number R32 is used. This further reduces the refrigerant amount in each of the refrigeration cycle devices 110 and 120 to achieve intended air-conditioning performance, thus further reducing the likelihood of the compressors 111 and 121 having seizure although the compressor protection devices are eliminated.

Embodiment 3

Wear of electrodes in pantographs, abrasion between the wheels and the rails, or the like leads to fine metal particles outside railway vehicles. More specifically, the electrodes in pantographs contain a copper alloy, and the wheels and the rails contain iron, leading to copper powder, iron powder, or the like. Such copper powder and iron powder may adhere to the outdoor heat exchangers 112 and 122.

As described above, the outdoor heat exchangers 112 and 122 include aluminum as a material of at least the planar heat-transfer members 310. Aluminum has a lower electric potential than copper and iron. Thus, when copper powder or iron powder adheres to a portion of the outdoor heat exchangers 112 and 122 formed from aluminum, the portion including aluminum may corrode.

In Embodiment 3, the body 330 of each of the outdoor heat exchangers 112 and 122 includes an insulator covering the externally exposed outer surface of at least the planar heat-transfer members 310 so as to have a covered structure.

The covering with the insulator may be achieved through electrodeposition. This reduces corrosion of the planar heat-transfer members 310 in the outdoor heat exchangers 112 and 122.

The embodiments described above may be modified as described below.

In Embodiment 1, compressor protection devices are eliminated. Instead, the structure may include fewer compressor protection devices than known structures. More specifically, one of the liquid-line electromagnetic valve 930 or the accumulator 950 serving as a compressor protection device illustrated in FIG. 5 may be eliminated, with the other being left. Similarly, one of the liquid-line electromagnetic valve 940 or the accumulator 960 may be eliminated, with the other being left.

In Embodiment 1, the outdoor heat exchangers 112 and 122 have the structure illustrated in FIGS. 3 and 4. Instead, simply the indoor heat exchangers 114 and 124, or both the outdoor heat exchangers 112 and 122 and the indoor heat exchangers 114 and 124 may have the structure illustrated in FIGS. 3 and 4.

The indoor heat exchangers 114 and 124 may be evaporators and have the planar heat-transfer members 310 placed with the upper surfaces parallel to the length direction and the airflow direction (hereafter simply referred to as upper surfaces) being oriented horizontally. In this case, condensate may accumulate on the upper surfaces. In contrast, as illustrated in FIG. 4, the outdoor heat exchangers 112 and 122 are placed with the upper surfaces being inclined. Thus, condensate is less likely to accumulate on the upper surfaces although the outdoor heat exchangers 112 and 122 are used as evaporators.

For indoor heat exchangers 114 and 124 that have the upper surfaces of the planar heat-transfer members 310 being oriented horizontally when including the structure illustrated in FIGS. 3 and 4, the structure illustrated in FIGS. 3 and 4 may be used for the outdoor heat exchangers 112 and 122, rather than for the indoor heat exchangers 114 and 124. The indoor heat exchangers 114 and 124 with the structure illustrated in FIGS. 3 and 4 may be placed with the upper surfaces of the planar heat-transfer members 310 being inclined. In this case, the indoor heat exchangers 114 and 124 with the structure illustrated in FIGS. 3 and 4 are less likely to have accumulation of condensate.

FIG. 6 illustrates the rotational shaft 152 inclined with respect to the bottom plate 210a of a casing 200, or more specifically, the rotational shaft 152 inclined with respect to the bottom plate 210a at an angle more than 0° and less than 90°. Instead, the rotational shaft 152 may be parallel to the bottom plate 210a, or more specifically, be at an angle of 0° with respect to the bottom plate 210a, or may be at an angle of 90° with respect to the bottom plate 210a.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-206434, filed on Dec. 14, 2020, the entire disclosure of which is incorporated by reference herein.

REFERENCE SIGNS LIST

100 Air conditioner
110, 120 Refrigeration cycle device
111, 121 Compressor
112, 122 Outdoor heat exchanger (Condenser)
113, 123 Expander
114, 124 Indoor heat exchanger (Evaporator)
115, 125 Refrigerant piping
130 Outdoor blower
140 Indoor blower
151 Motor
152 Rotational shaft
153 Compressor assembly
154 Housing
155 Lubricant
200 Casing
210 Base frame
210a Bottom plate
220 Top plate
230, 240 Partition wall
251 First vent
252 Second vent
253 Third vent
310 Planar heat-transfer member
311 Refrigerant flow path
320 Fin
330 Body
340 First header pipe
341 Partition
350 Second header pipe
360 Inlet
370 Outlet
400 Air conditioning apparatus for railway vehicle
900 Air conditioning apparatus for railway vehicle
910, 920 Outdoor heat exchanger
911a, 911b, 911c, 911d Heat-transfer pipe
912 Fin
913 Inlet
914 Outlet
930, 940 Liquid-line electromagnetic valve (Compressor protection device)
950, 960 Accumulator (Compressor protection device)
AF Airflow
S1 Outdoor-unit chamber
S2 Indoor-unit chamber
S3 Compressor chamber
VP Imaginary XZ plane

The invention claimed is:

1. An air conditioning apparatus for air-conditioning a passenger compartment of a railway vehicle, the air conditioning apparatus comprising a first refrigerant circuit and a second refrigerant circuit, wherein each of the first refrigerant circuit and the second refrigerant circuit comprises:
   a compressor that includes a motor and a rotational shaft to be rotated by the motor, wherein the compressor is configured to compress a refrigerant with rotation of the rotational shaft;
   a condenser to condense the refrigerant compressed by the compressor;
   an expansion valve to expand the refrigerant condensed by the condenser;
   an evaporator to vaporize the refrigerant expanded by the expansion valve; and
   refrigerant piping that is included in a refrigeration cycle device for circulation of the refrigerant by connecting the compressor, the condenser, the expansion valve, and the evaporator, wherein the compressor is placed horizontally with the rotational shaft inclined with respect to a vertical direction, the condenser and the expansion valve are directly connected with a first unbranched portion of the refrigerant piping, the expansion valve and the evaporator are directly connected with a second unbranched portion of the refrigerant piping, the evaporator and the compressor are directly connected with a third unbranched portion of the refrigerant piping, the compressor and the condenser are directly connected with a fourth unbranched portion of the refrigerant piping, one of the condenser or the evaporator is an indoor heat exchanger to perform heat exchange between the refrigerant and air in the passenger compartment of the railway vehicle, and the other of the condenser or the evaporator is an outdoor heat exchanger to perform heat exchange between the refrigerant and air outside the railway vehicle, and at least one of the outdoor heat exchanger or the indoor heat exchanger includes a body including planar heat-transfer members and fins, the planar heat-transfer members and the fins being alternately stacked in a thickness direction of the planar heat-transfer members so as to have a stacked structure, each of the planar heat-transfer members including at an interior thereof a plurality of refrigerant flow paths for flow therethrough of the refrigerant, the plurality of refrigerant flow paths in each of the planar heat-transfer members being arranged at the interior of the planar heat-transfer member in a direction in which air is to pass through the fins.

2. The air conditioning apparatus according to claim 1, wherein the refrigerant comprises at least 50% by mass of difluoromethane.

3. The air conditioning apparatus according to claim 1, wherein the body further includes an insulator covering at least outer surfaces of the planar heat-transfer members so as to have a covered structure.

* * * * *